United States Patent
Liao et al.

(10) Patent No.: US 10,120,615 B2
(45) Date of Patent: Nov. 6, 2018

(54) MEMORY MANAGEMENT METHOD AND STORAGE CONTROLLER USING THE SAME

(71) Applicant: Shenzhen EpoStar Electronics Limited CO., Shenzhen OT (CN)

(72) Inventors: Shih-Tien Liao, Hsinchu (TW); Hung-Chih Hsieh, Hsinchu County (TW); Yu-Hua Hsiao, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 15/361,005

(22) Filed: Nov. 24, 2016

(65) Prior Publication Data

US 2018/0095698 A1    Apr. 5, 2018

(30) Foreign Application Priority Data

Oct. 4, 2016 (TW) .............................. 105132019 A

(51) Int. Cl.
   *G06F 3/06* (2006.01)
(52) U.S. Cl.
   CPC .......... *G06F 3/0659* (2013.01); *G06F 3/0604* (2013.01); *G06F 3/0644* (2013.01); *G06F 3/0679* (2013.01); *H05K 999/99* (2013.01)
(58) Field of Classification Search
   CPC ................................................... G06F 12/0246
   See application file for complete search history.

(56) References Cited

U.S. PATENT DOCUMENTS

| 8,489,942 | B1 | 7/2013 | Wong et al. | |
| 2011/0264843 | A1* | 10/2011 | Haines | ................ G06F 12/0246 |
| | | | | 711/103 |
| 2012/0036369 | A1 | 2/2012 | Chang | |
| 2012/0096217 | A1* | 4/2012 | Son | ..................... G06F 12/0246 |
| | | | | 711/103 |

FOREIGN PATENT DOCUMENTS

| TW | 200821829 | 5/2008 |
| TW | 201241623 | 10/2012 |
| TW | 201537576 | 10/2015 |

OTHER PUBLICATIONS

"Office Action of Taiwan Counterpart Application," dated Mar. 16, 2017, p. 1-p. 3.

* cited by examiner

*Primary Examiner* — Edward J Dudek, Jr.
(74) *Attorney, Agent, or Firm* — JCIPRNET

(57) ABSTRACT

A memory management method is provided. The method includes writing a plurality of first data into a first physical block and storing a first stamp corresponding to the first physical block; writing a plurality of second data into a second physical block and storing a second stamp corresponding to the second physical block, wherein the second stamp is greater than the first stamp; moving a plurality of third data in the first data in the first physical block to a third physical block, wherein the third data are valid data and the third data match a specific type; and storing a third stamp corresponding to the third physical block and updating the second stamp corresponding to the second physical block to a fourth stamp, wherein the fourth stamp is greater than the third stamp and the third stamp is greater than or equal to the second stamp.

20 Claims, 7 Drawing Sheets

Actual time =Xt

First physical block 201

| | Data | Time stamp | Type |
|---|---|---|---|
| 0 | First data | T | Host write |
| 1 | First data | T | Host write |
| 2 | First data:LBA(5)* | T | Host write |

Second physical block 202

| | Data | Time stamp | Type |
|---|---|---|---|
| 0 | Second data | T+1 | Host write |
| 1 | Second data | T+1 | Host write |
| 2 | | | |

FIG. 2A

Actual time =Xt+1

First physical block 201

| | Data | Time stamp | Type |
|---|---|---|---|
| 0 | First data | T | Host write |
| 1 | First data | T | Host write |
| 2 | First data:LBA(5)* | T | Host write |

Second physical block 202

| | Data | Time stamp | Type |
|---|---|---|---|
| 0 | Second data | T+1 | Host write |
| 1 | Second data | T+1 | Host write |
| 2 | | | |

Third physical block 203

| | Data | Time stamp | Type |
|---|---|---|---|
| 0 | Third data | T+1 | Garbage collection |
| 1 | Third data:LBA(5)* | T+1 | Garbage collection |
| 2 | | | |

FIG. 2B

Actual time =Xt+2

First physical block 201

| | Data | Time stamp | Type |
|---|---|---|---|
| 0 | First data | T | Host write |
| 1 | First data | T | Host write |
| 2 | First data:LBA(5)* | T | Host write |

Second physical block 202

| | Data | Time stamp | Type |
|---|---|---|---|
| 0 | Second data | T+1 | Host write |
| 1 | Second data | T+1 | Host write |
| 2 | Fourth data:LBA(5)* | T+2 | Host write |

Third physical block 203

| | Data | Time stamp | Type |
|---|---|---|---|
| 0 | Third data | T+1 | Garbage collection |
| 1 | Third data:LBA(5)* | T+1 | Garbage collection |
| 2 | | | |

Actual time = Xt

First physical block — 301

| | Data | Time stamp | Type |
|---|---|---|---|
| 0 | First data | T | Host write |
| 1 | First data | T | Host write |
| 2 | First data:LBA(5)* | T | Host write |

Second physical block — 302

| | Data | Time stamp | Type |
|---|---|---|---|
| 0 | Second data | T+1 | Host write |
| 1 | Second data | T+1 | Host write |
| 2 | | | |

FIG. 3B

Actual time = Xt+1

First physical block — 301

| | Data | Time stamp | Type |
|---|---|---|---|
| 0 | First data | T | Host write |
| 1 | First data | T | Host write |
| 2 | First data:LBA(5)* | T | Host write |

Second physical block — 302

| | Data | Time stamp | Type |
|---|---|---|---|
| 0 | Second data | T+1 | Host write |
| 1 | Second data | T+1 | Host write |
| 2 | | | |

Third physical block — 303

| | Data | Time stamp | Type |
|---|---|---|---|
| 0 | Third data | T+2 | Garbage collection |
| 1 | Third data:LBA(5)* | T+2 | Garbage collection |
| 2 | | | |

FIG. 3C

Actual time = Xt+2

First physical block — 301

| | Data | Time stamp | Type |
|---|---|---|---|
| 0 | First data | T | Host write |
| 1 | First data | T | Host write |
| 2 | First data:LBA(5)* | T | Host write |

Second physical block — 302

| | Data | Time stamp | Type |
|---|---|---|---|
| 0 | Second data | T+1 | Host write |
| 1 | Second data | T+1 | Host write |
| 2 | Fourth data:LBA(5)* | T+3 | Host write |

Third physical block — 303

| | Data | Time stamp | Type |
|---|---|---|---|
| 0 | Third data | T+2 | Garbage collection |
| 1 | Third data:LBA(5)* | T+2 | Garbage collection |
| 2 | | | |

| Actual time = Xt | | | | First physical block 401 | | | Second physical block 402 | | | | System block 410 | |
|---|---|---|---|---|---|---|---|---|---|---|---|---|
| | | | | Data | Type | | Data | Type | | | Block | Time stamp |
| | 0 | | | First data | Host write | | Second data | Host write | | | First physical block | T |
| | 1 | | | First data | Host write | | Second data | Host write | | | Second physical block | T+1 |
| | 2 | | | First data:LBA(5)* | Host write | | | | | | | |

FIG. 4A

| Actual time = Xt+1 | | | | First physical block 401 | | | Second physical block 402 | | | Third physical block 403 | | | System block 410 | |
|---|---|---|---|---|---|---|---|---|---|---|---|---|---|---|
| | | | | Data | Type | | Data | Type | | Data | Type | | Block | Time stamp |
| | 0 | | | First data | Host write | | Second data | Host write | | Third data | Garbage collection | | First physical block | T |
| | 1 | | | First data | Host write | | Second data | Host write | | Third data:LBA(5)* | Garbage collection | | Second physical block | T+2 |
| | 2 | | | First data:LBA(5)* | Host write | | | | | | | | Third physical block | T+1 |

FIG. 4B

| Actual time = Xt+2 | | | | First physical block 401 | | | Second physical block 402 | | | Third physical block 403 | | | System block 410 | |
|---|---|---|---|---|---|---|---|---|---|---|---|---|---|---|
| | | | | Data | Type | | Data | Type | | Data | Type | | Block | Time stamp |
| | 0 | | | First data | Host write | | Second data | Host write | | Third data | Garbage collection | | First physical block | T |
| | 1 | | | First data | Host write | | Second data | Host write | | Third data:LBA(5)* | Garbage collection | | Second physical block | T+2 |
| | 2 | | | First data:LBA(5)* | Host write | | Fourth data:LBA(5)* | Host write | | | | | Third physical block | T+1 |

Actual time =Xt

First physical block — 501

| | Data | Type |
|---|---|---|
| 0 | First data | Host write |
| 1 | First data | Host write |
| 2 | First data :LBA(5)* | Host write |

Second physical block — 502

| | Data | Type |
|---|---|---|
| 0 | Second data | Host write |
| 1 | Second data | Host write |
| 2 | | |

System block — 510

| Block | Time stamp |
|---|---|
| First physical block | T |
| Second physical block | T+1 |

FIG. 5B

Actual time =Xt+1

First physical block — 501

| | Data | Type |
|---|---|---|
| 0 | First data | Host write |
| 1 | First data | Host write |
| 2 | First data :LBA(5)* | Host write |

Second physical block — 502

| | Data | Type |
|---|---|---|
| 0 | Second data | Host write |
| 1 | Second data | Host write |
| 2 | | |

Third physical block — 503

| | Data | Type |
|---|---|---|
| 0 | Third data | Garbage collection |
| 1 | Third data :LBA(5)* | Garbage collection |
| 2 | | |

System block — 510

| Block | Time stamp |
|---|---|
| First physical block | T |
| Second physical block | T+3 |
| Third physical block | T+2 |

FIG. 5C

Actual time =Xt+2

First physical block — 501

| | Data | Type |
|---|---|---|
| 0 | First data | Host write |
| 1 | First data | Host write |
| 2 | First data :LBA(5)* | Host write |

Second physical block — 502

| | Data | Type |
|---|---|---|
| 0 | Second data | Host write |
| 1 | Second data | Host write |
| 2 | Fourth data:LBA(5)* | Host write |

Third physical block — 503

| | Data | Type |
|---|---|---|
| 0 | Third data | Garbage collection |
| 1 | Third data :LBA(5)* | Garbage collection |
| 2 | | |

System block — 510

| Block | Time stamp |
|---|---|
| First physical block | T |
| Second physical block | T+3 |
| Third physical block | T+2 |

MEMORY MANAGEMENT METHOD AND STORAGE CONTROLLER USING THE SAME

CROSS-REFERENCE TO RELATED APPLICATION

This application claims the priority benefit of Taiwan application serial no. 105132019, filed on Oct. 4, 2016. The entirety of the above-mentioned patent application is hereby incorporated by reference herein and made a part of this specification.

BACKGROUND

Technical Field

The invention relates to a memory management method and a storage controller using the same, and more particularly, relates to a memory management method for solving an asynchronous data write issue by modifying stamps and a storage controller using the method.

Description of Related Art

The growth of digital cameras, mobile phones, and MP3 players has been rapid in recent years. Consequently, the consumers' demand for storage media has increased tremendously. Rewritable non-volatile memories are the most adaptable memories for said electronic products due to its data non-volatility, low power consumption, small volume, non-mechanical structure and high read/write speed. For these reasons, flash memories have become an import part of the electronic industries. For example, an eMMC (embedded Multi Media Card) widely adopted in mobile electronic devices is a storage device that uses the flash memory as a storage medium.

Solid state drives (SSDs) have become a popular storage medium due to price reduction of NAND flash memories. Still, the NAND flash memories have shortcomings to be overcome. For instance, a data in-place update (i.e., overwriting the update data at addresses of the original data) cannot be performed efficiently. Hence, most of flash memory-based SSDs adopt an out-of-place update scheme with a flash translation layer (FTL) and a garbage collection mechanism (which writes the update data into other addresses and sets the original data as invalid data) to manage an address translation from logical address to physical address and reuse the flash memory. Due to the limited endurance of the flash memory, it is important to find a way of improving efficiency in garbage collection. Recently, a hot/cold data separation FTL has been proposed to provide the capability of performing hot data/cold data identification for any programmed data and separately writing them to different blocks. Nonetheless, aforesaid data separation method may cause the asynchronous data write issue between a host write block and a garbage collection block. After rebooting, it takes a great effort to identify which data in the blocks are valid ones.

Specifically, in order to separate the hot data and the cold data from each other, the flash translation layer prepares another block other than the host write block dedicated for a garbage collection operation. However, a time slot window will appear since the flash translation layer tables (FTL tables) are not instantly updated to the NAND flash memory. None of programming operations within the time slot is stored to the NAND flash memory before the next time the FTL table is updated. Therefore, it is quite hard to maintain data integrity after the SSD is rebooted in certain programming sequences. To solve this issue, a firmware of the flash translation layer needs to keep the property of each block for distinguishing between the host write block from the garbage collection block. After rebooting, the data may be restored by the firmware using two approaches. One of the approaches involves directly abandoning all the data in the garbage collection block, which leads to waste of time on the previous operations of moving data to the garbage collection block. The other approach involves comparing data in the host write block and the garbage collection block to each other and considering the data with the property of the host write block as the latest data, which consumes a great deal of time in comparing the logical block addresses of said two blocks.

Accordingly, finding a way of solving the asynchronous data write issue with less resources and time to improve the efficiency on data access while reducing waste of resources is one of the major subjects to be addressed by those skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention relates to a memory management method and a storage controller using the same, which are capable of maintaining a data consistency in the flash translation layer of the cold data and hot data separation.

The invention provides a memory management method, which is adapted to a rewritable non-volatile memory module. The rewritable non-volatile memory module includes a plurality of physical blocks. Each of the physical blocks includes a plurality of physical programming units. The physical blocks include a first physical block, a second physical block and a third physical block. The memory management method includes: writing a plurality of first data into a first physical block and storing a first stamp corresponding to the first physical block; writing a plurality of second data into a second physical block and storing a second stamp corresponding to the second physical block, where the second stamp is greater than the first stamp; moving a plurality of third data in the first data in the first physical block to a third physical block, where the third data are valid data and match a specific type; and storing a third stamp corresponding to the third physical block and updating the second stamp corresponding to the second physical block to a fourth stamp, where the fourth stamp is greater than the third stamp and the third stamp is greater than or equal to the second stamp.

In an embodiment of the invention, the memory management method further includes: writing a fourth data into the second physical block; and updating flash translation layer tables corresponding to the third data and the fourth data in sequence according to the third stamp and the fourth stamp after the rewritable non-volatile memory module is powered down and rebooted.

In an embodiment of the invention, the step of updating the flash translation layer tables corresponding to the third data and the fourth data in sequence according to the third stamp and the fourth stamp includes: updating the flash translation layer table corresponding to the third physical block storing the third data and the flash translation layer table corresponding to the second physical block storing the fourth data in sequence according to the third stamp and the fourth stamp.

In an embodiment of the invention, the third data is determined as matching the specific type when logical pages corresponding to the third data in the first physical block are not updated within a predetermined time.

In an embodiment of the invention, the first stamp, the second stamp, the third stamp and the fourth stamp are stored in a system block of the physical blocks.

The invention provides a storage controller, which is configured to access a rewritable non-volatile memory module and coupled to a host system through a connection interface circuit. The storage controller includes: a memory interface control circuit, configured to couple to the rewritable non-volatile memory module, where the rewritable non-volatile memory module includes a plurality of physical blocks, each of the physical blocks includes a plurality of physical programming units, the physical blocks include a first physical block, a second physical block and a third physical block; a processor, coupled to the connection interface circuit and the memory interface control circuit; and a data transfer management circuit, coupled to the processor, the connection interface circuit and the memory interface control circuit. The processor writes a plurality of first data into the first physical block and stores a first stamp corresponding to the first physical block. The processor writes a plurality of second data into the second physical block and stores a second stamp corresponding to the second physical block. The second stamp is greater than the first stamp. The processor moves a plurality of third data in the first data in the first physical block to the third physical block. The third data are valid data and the third data match a specific type. The processor stores a third stamp corresponding to the third physical block and updates the second stamp corresponding to the second physical block to a fourth stamp. The fourth stamp is greater than the third stamp and the third stamp is greater than or equal to the second stamp.

In an embodiment of the invention, the processor writes a fourth data into the second physical block, and the processor updates flash translation layer tables corresponding to the third data and the fourth data in sequence according to the third stamp and the fourth stamp after the rewritable non-volatile memory module is powered down and rebooted.

In an embodiment of the invention, the processor updates the flash translation layer table corresponding to the third physical block storing the third data and the flash translation layer table corresponding to the second physical block storing the fourth data in sequence according to the third stamp and the fourth stamp.

In an embodiment of the invention, the processor determines the third data as matching the specific type when logical pages corresponding to the third data in the first physical block are not updated within a predetermined time.

In an embodiment of the invention, the first stamp, the second stamp, the third stamp and the fourth stamp are stored in a system block of the physical blocks.

The invention provides a memory management method, which is adapted to a rewritable non-volatile memory module. The rewritable non-volatile memory module includes a plurality of physical blocks. Each of the physical blocks includes a plurality of physical programming units. The physical blocks include a first physical block, a second physical block and a third physical block. The memory managing method includes: writing a plurality of first data into the first physical block and storing a first stamp corresponding to the first data; writing a plurality of second data into the second physical block and storing a second stamp corresponding to the second data, where the second stamp is greater than the first stamp; moving a plurality of third data in the first data in the first physical block to a third physical block, where the third data are valid data and the third data match a specific type; storing a third stamp corresponding to the third data, where the third stamp is greater than or equal to the second stamp; writing a fourth data into the second physical block and storing a fourth stamp corresponding to the fourth data, where the fourth stamp is greater than the third stamp.

In an embodiment of the invention, the memory management method further includes: updating flash translation layer tables corresponding to the third data and the fourth data in sequence according to the third stamp and the fourth stamp after the rewritable non-volatile memory module is powered down and rebooted.

In an embodiment of the invention, the step of updating the flash translation layer tables corresponding to the third data and the fourth data in sequence according to the third stamp and the fourth stamp includes: updating the flash translation layer table corresponding to the third physical block storing the third data and the flash translation layer table corresponding to the second physical block storing the fourth data in sequence according to the third stamp and the fourth stamp.

In an embodiment of the invention, the third data is determined as matching the specific type when logical pages corresponding to the third data in the first physical block are not updated within a predetermined time.

In an embodiment of the invention, the first stamp, the second stamp, the third stamp and the fourth stamp are stored in an out of band area corresponding to each of the physical programming units of the physical blocks.

The invention provides a storage controller, which is configured to access a rewritable non-volatile memory module and coupled to a host system through a connection interface circuit. The storage controller includes: a memory interface control circuit, configured to couple to the rewritable non-volatile memory module, where the rewritable non-volatile memory module includes a plurality of physical blocks, each of the physical blocks includes a plurality of physical programming units, the physical blocks include a first physical block, a second physical block and a third physical block; a processor, coupled to the connection interface circuit and the memory interface control circuit; and a data transfer management circuit, coupled to the processor, the connection interface circuit and the memory interface control circuit. The processor writes a plurality of first data into the first physical block and stores a first stamp corresponding to the first data. The processor writes a plurality of second data into the second physical block and stores a second stamp corresponding to the second data. The second stamp is greater than the first stamp. The processor moves a plurality of third data in the first data in the first physical block to the third physical block. The third data are valid data and the third data match a specific type. The processor stores a third stamp corresponding to the third data. The third stamp is greater than or equal to the second stamp. The processor writes a fourth data into the second physical block and stores a fourth stamp corresponding to the fourth data. The fourth stamp is greater than the third stamp.

In an embodiment of the invention, the processor updates flash translation layer tables corresponding to the third data and the fourth data in sequence according to the third stamp and the fourth stamp after the rewritable non-volatile memory module is powered down and rebooted.

In an embodiment of the invention, the processor updates the flash translation layer table corresponding to the third physical block storing the third data and the flash translation layer table corresponding to the second physical block storing the fourth data in sequence according to the third stamp and the fourth stamp.

In an embodiment of the invention, the processor determines the third data as matching the specific type when logical pages corresponding to the third data in the first physical block are not updated within a predetermined time.

In an embodiment of the invention, the first stamp, the second stamp, the third stamp and the fourth stamp are stored in an out of band area corresponding to each of the physical programming units of the physical blocks.

Based on the above, according to the memory management method and the storage controller using the method proposed in the invention, the stamp of the host write block is updated when the garbage collection is performed on the cold data so the stamp of the host write block becomes greater than the stamp of the garbage collection block. By doing so, even if part of logical addresses of data in the host write block are identical to part of logical addresses of data in the garbage collection block, the flash translation layer table of the garbage collection block is updated before updating the flash translation layer table of the host write block when the storage device is powered down and rebooted (i.e., power cycling). Therefore, the asynchronous data write issue can be solved.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A to FIG. 2C are schematic diagrams illustrating the memory management method according to an embodiment of the invention.

FIG. 3A to FIG. 3C are schematic diagrams illustrating the memory management method according to another embodiment of the invention.

FIG. 4A to FIG. 4C are schematic diagrams illustrating the memory management method according to another embodiment of the invention.

FIG. 5A to FIG. 5C are schematic diagrams illustrating the memory management method according to another embodiment of the invention.

DESCRIPTION OF THE EMBODIMENTS

Figure 1:
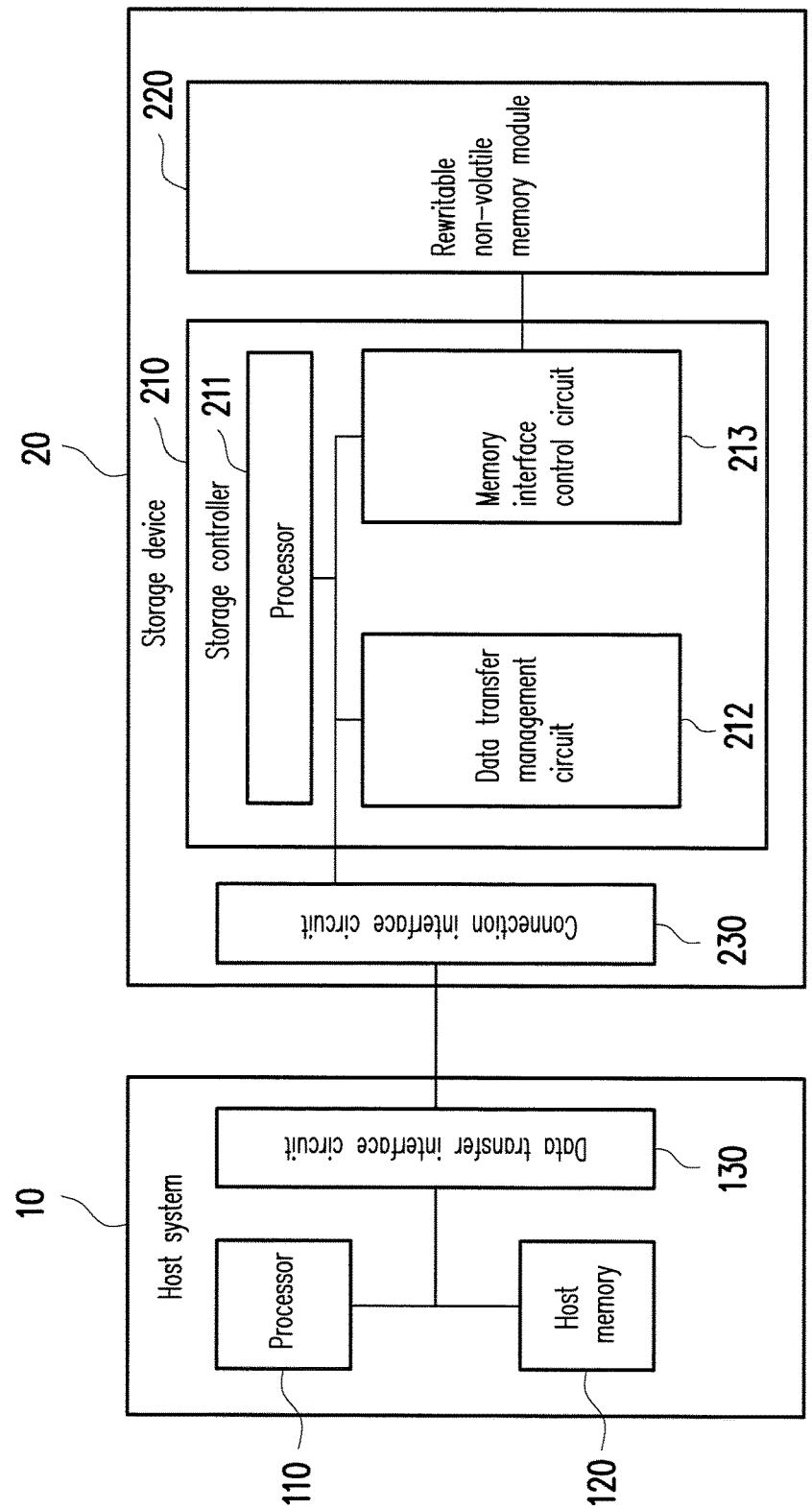
FIG. 1 is a block diagram illustrating a host system and a storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a storage device includes a rewritable non-volatile memory module and a storage device controller (also known as a storage controller or a storage control circuit). The storage device is usually used together with a host system so the host system may write data into or read data from the storage device.

FIG. 1 is a block diagram illustrating a host system and a storage device according to an embodiment of the invention.

Referring to FIG. 1, a host system 10 includes a processor 110, a host memory 120 and a data transfer interface circuit 130. In the present embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data transfer management circuit 212 and a memory interface control circuit 213.

In the present embodiment, the host system 10 is coupled to the storage device 20 through the data transfer interface circuit 130 and the connection interface circuit 230 of the storage device 20 to perform a data access operation. For example, the host system 10 can store data to the storage device 20 or read data from the storage device 20 through the data transfer interface circuit 130.

In the present embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module, a network interface card, a wireless transmission device, a keyboard, a monitor and a speaker through the system bus.

In the present embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the invention is not limited thereto. The data transfer interface circuit 130 and the connection interface circuit 230 may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In the present embodiment, the host memory 120 is configured to temporarily store commands executed by the processor 110 or data. For instance, in the present exemplary embodiment, the host memory 120 may be a Dynamic Random Access Memory (DRAM), or a Static Random Access Memory (SRAM) and the like. Nevertheless, it should be understood that the invention is not limited thereto, and the host memory 120 may also be other appropriate memories. More specifically, in the present embodiment, the host memory 120 may be divided into a plurality of memory pages to be used in a storage management of the commands and the data. Each of the memory pages has a starting address (Starting Address of Memory Page; SAMP) and an ending address (Ending Address of Memory Page; EAMP). In the present embodiment, each of the memory pages is addressed by utilizing a 16-bit address. For example, the starting address (SAMP) of a foremost memory page being sorted may be set as "0x0000", and the ending address (EAMP) thereof may set as "0x0FFF". A size of each of the memory pages is 4096 bytes (i.e., 4 KB). A total space of the memory pages used for the data transfer by the host memory is 64 KB (i.e., 16 memory pages in total). However, the invention is not intended to limit an addressing scheme for the host memory. For example, in another embodiment, the host memory may include more or less space, and may correspondingly perform the addressing scheme with use of a proper addressing method.

The storage controller 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It is noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements, which are not particularly limited by the invention.

In an embodiment, the storage controller 210 further includes a ROM (not illustrated) and a RAM (not illustrated). More particularly, the ROM has a boot code, which is executed by the processor 221 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In the present embodiment, as described above, the storage controller 210 further includes the data transfer management circuit 212 and the memory interface control circuit 213.

Among them, the data transfer management circuit 212 is coupled to the processor 211, the memory interface control circuit 213 and the connection interface circuit 230. The data transfer management circuit 212 is configured to receive instruction of the processor 211 to perform the data transfer. For example, the data may be read from host system 10 (e.g., the host memory 120) through the connection interface circuit 230, and the read data may be written into the rewritable non-volatile memory module 220 through the memory interface control circuit 213. As another example, the data may be read from the rewritable non-volatile memory module 220 through the memory interface control circuit 213, and the read data may be written into the host system 10 (e.g., the host memory 120) through the connection interface circuit 230. Functions of the data transfer management circuit 212 in the invention are described in more detail with reference to various drawings and embodiments.

The memory interface control circuit 213 is configured to receive instruction of the processor 211 and perform data writing (or, programming) and reading operations for the rewritable non-volatile memory module 220 together with the data transfer management circuit 212. The memory interface control circuit 213 may also perform an erasing operation for the rewritable non-volatile memory module 220.

For instance, the processor 211 may execute a write command sequence to instruct the memory interface control circuit 213 to write the data into the rewritable non-volatile memory module 220; the processor 211 may execute a read command sequence to instruct the memory interface control circuit 213 to read the data from the rewritable non-volatile memory module 220; the processor 211 may execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding operations of writing, reading and erasing for the rewritable non-volatile memory module 220. In an embodiment, the processor 211 may further give other command sequences to the memory interface control circuit 213 in order to perform the corresponding operations for the rewritable non-volatile memory module 220.

In addition, data to be written to the rewritable non-volatile memory module 220 is converted into a format acceptable by the rewritable non-volatile memory module 220 through the memory interface control circuit 213. Specifically, when the processor 211 intends to access the rewritable non-volatile memory module 220, the processor 211 sends the corresponding command sequences to the memory interface control circuit 213 in order to instruct the memory interface control circuit 213 to perform the corresponding operations. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). The command sequences may include one or more signals, or data from the bus. The signals or the data may include command codes and program codes. For example, information such as identification codes and memory addresses are included in the read command sequence.

In the present embodiment, the memory interface control circuit 213 further identifies states of logical blocks assigned to the rewritable non-volatile memory module 220. The memory interface control circuit 213 may also identify states of physical blocks of the rewritable non-volatile memory module 220. More specifically, after the memory interface control circuit 213 sends read/write requests to the rewritable non-volatile memory module 220 according to read/write commands, the memory interface control circuit 213 identifies whether a state of the storage unit (e.g., the physical block or a physical page, or the corresponding logical block or a logical page) of the rewritable non-volatile memory module 220 is a readiness state. For instance, when the memory interface control circuit 213 identifies that the physical blocks corresponding to the read/write commands are ready for the data transfer, the memory interface control circuit 213 can send a state report indicating that the logical block mapped to the physical block is in the readiness state. In other words, the memory interface control circuit 213 determines whether the state of the logical block is the readiness state by determining whether the physical blocks mapped by the logical block is ready for the data transfer. The memory interface control circuit 213 can actively determine whether the state of the corresponding physical block is ready for the data transfer, and may also passively receive the state report of the corresponding physical block from the rewritable non-volatile memory module 220. The invention is not intended to limit how the memory interface control circuit 213 identifies whether the physical block/logical block for the data access is in the readiness state.

The rewritable non-volatile memory module 220 is coupled to the storage controller 210 and configured to store data written from the host system 10. The rewritable non-volatile memory module 220 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features. The memory cells in the rewritable non-volatile memory module 220 are disposed in an array.

In the present embodiment, the memory cells of the rewritable non-volatile memory module 220 can constitute a plurality of physical programming units, and the physical programming units can constitute a plurality of physical blocks (also known as physical erasing units). Specifically, the memory cells on the same word line (or the same word line layer) can constitute one or more of the physical programming units. If each of the memory cells may be used to store two or more bits, the physical programming units on the same word line (or the same word line layer) may be at least classified into one lower physical programming unit and one upper physical programming unit.

In an embodiment, if each of the memory cells may be used to store two bits, the physical programming units on the same word line (or the same word line layer) may be classified into one lower physical programming unit and one upper physical programming unit. For instance, a least significant bit (LSB) of one memory cell belongs to the lower physical programming unit, and a most significant bit (MSB) of one memory cell belongs to the upper physical programming unit. Generally, a writing speed of the lower physical programming unit is higher than a writing speed of the upper physical programming unit, and/or a reliability of the lower physical programming unit is higher than a reliability of the upper physical programming unit. In an embodiment, if each of the memory cells may be used to store three bits, the physical programming units on the same word line (or the same word line layer) may be classified into one lower physical programming unit, one upper physical programming unit and one extra physical programming unit. For example, a least significant bit (LSB) one memory cell belongs to the lower physical programming unit, a center significant bit (CSB) of one memory cell belongs to the upper physical programming unit, and a most significant bit (MSB) of one memory cell belongs to the extra physical programming unit.

In the present embodiment, the storage unit used for writing (programming) the data is the physical block. The physical block may also be referred to as the physical erasing unit or a physical unit. The physical erasing unit is the minimal unit for erasing. Namely, each physical erasing unit contains the least number of memory cells to be erased together. Each of the physical blocks has a plurality of physical programming units. The physical programming unit is the physical page or a physical sector. When the physical programming units are the physical pages, the physical programming units usually include a data bit area and a redundancy bit area. The data bit area includes multiple physical sectors configured to store user data, and the redundant bit area is configured to store system data (e.g., an error correcting code).

However, the invention is not limited thereto. For example, in another embodiment, the data transfer method described in the present embodiment may also be modified and applied to the rewritable non-volatile memory module 220 with the storage unit being the physical programming unit as a unit for writing data.

In an embodiment, the storage controller 210 manages the memory cells in the rewritable non-volatile memory module 220 based on the physical unit. For example, in the following embodiments, examples in which one physical block serves as one physical unit are provided. However, in another embodiment, one physical unit may also refer to a composition with any number of memory cells, depending on practical requirements. Further, it should be understood that, when the storage controller 211 groups the memory cells (or the physical units) in the rewritable non-volatile memory module 220 for the corresponding management operations, the memory cells (or the physical units) are logically grouped but their actual locations are not changed.

The storage controller 210 assigns a plurality of logical units for mapping to a plurality of physical units of the rewritable non-volatile memory module 220 for storing the user data, and the host system 10 accesses the user data stored in the physical units for storing the user data through the logical units. Herein, each of the logical units may be constituted by one or more logic addresses. For example, the logic unit may be a logical block, a logical page or a logical sector. One logical unit may be mapped to one or more physical units, where the physical unit may be one or more physical addresses, one or more physical sectors, one or more physical programming units, or one or more physical erasing units. In the present embodiment, the logical unit is the logical block.

For instance, the storage controller 210 establishes a logical to physical address mapping table and a physical to logical address mapping table to record a mapping relation between the logical unit (e.g., the logical block, the logical page or the logical sector) assigned to the rewritable non-volatile memory module 220 and the physical unit (e.g., the physical erasing unit, the physical programming unit or the physical sector). In other words, the storage controller 210 may look up for the physical unit mapped to one logical unit by using the logical to physical address mapping table, and the storage controller 210 may look up for the logical unit mapped to one physical unit by using the physical to logical address mapping table. Nonetheless, the technical concept for the mapping relation between the logical unit and the physical unit is a well-known technical means in the field, which is not repeated hereinafter.

In an embodiment, the storage controller 210 further includes a buffer memory (not illustrated) and a power management circuit (not illustrated). The buffer memory is coupled to the processor 211 and configured to temporarily store data and commands from the host system 10, data from the rewritable non-volatile memory module 220 or other system data for managing the storage device 20. The power management circuit is coupled to the processor 211 and configured to control power of the storage device 20.

While the processor 21 instructs to write the data into one physical block of the rewritable non-volatile memory module 220, the processor 211 also stores one time stamp corresponding to that physical block. The time stamp is one unique incremental serial number, allowing the processor 211 to determine a writing sequence for each of the physical blocks according to a value of the time stamp. In an embodiment, the processor 211 can store a serial number of each physical block and the corresponding time stamp to one specific system block, but the invention is not limited thereto. In another embodiment, the processor 211 may also store the time stamp to an out of band (OOB) area corresponding to each page in the physical block. In another embodiment, the processor 211 may also store the time stamp to an out of band (OOB) area corresponding to each codeword in each page in the physical block.

The memory management method and the storage controller 210 using said method are described below with reference to FIG. 1 and the subsequently drawings.

FIG. 2A to FIG. 2C are schematic diagrams illustrating the memory management method according to an embodiment of the invention.

With reference to FIG. 2A, FIG. 2A shows an operation of the processor 211 during an actual time Xt. Specifically, the processor 211 writes first data into a first physical block 201 and stores a first stamp corresponding to the first data (i.e., writing a time stamp T into the field of "Time stamp" corresponding to the first data). When all the pages (i.e., pages 0, 1 and 2) in the first physical block 201 are fully written by the first data, the processor 211 continues to write second data into a second physical block 202 and store a second stamp corresponding to the second data (i.e., writing a time stamp T+1 into the field of "Time stamp" corresponding to the second data). It should be noted that, the first data and the second data may be data to be written into the physical blocks instructed by the same write command or data to be written into the physical blocks instructed by different write commands during the actual time Xt. Because both the first data and the second data are host write data, information indicating "Host write" is written into the fields of "Type" corresponding to the first data and the second data, and such information may be a specific value represented by at least one bit.

Noted that, for descriptive convenience, it is assumed that the first physical block 201 (or the second physical block 202, a third physical block 203 in FIG. 2B) includes the physical pages 0, 1 and 2 in the present embodiment, but the invention is not limited by one physical block having only three physical pages. For instance, in another embodiment, the first physical block 201 may include more physical pages. Alternatively, in yet another embodiment, the reference numbers 0, 1 and 2 in FIG. 2A may also represent that the first physical block 201 or other physical blocks include codewords 0, 1 and 2, or include more codewords.

With reference to FIG. 2B, FIG. 2B shows an operation of the processor 211 during an actual time Xt+1. Specifically, the processor 211 can perform the garbage collection operation on the first data in the first physical block 201. For instance, when the processor 211 determines that the first data of the physical pages 1 and 2 of the first physical block 201 (hereinafter, also known as the third data) are valid data and match a specific type (i.e., the logical pages corresponding to the third data in the first physical block 201 are not updated within a predetermined time), the processor 211 moves the third data to one garbage collection block, for example, the physical pages 0 and 1 of the third physical block 203. Meanwhile, the processor 211 writes a third stamp (i.e., a time stamp T+1) into the field of "Time stamp" corresponding to the physical pages 0 and 1 of the third physical block 203. Herein, the third stamp is equal to the second stamp. The processor 211 also writes information indicating "Garbage collection" into the field of "Type" corresponding to the physical pages 0 and 1 of the third physical block 203, and such information may be a specific value represented by at least one bit.

With reference to FIG. 2C, FIG. 2C shows an operation of the processor 211 during an actual time Xt+2. Specifically, when the processor 211 writes fourth data into the physical page 2 of the second physical block 202, the processor 211 writes a fourth stamp (i.e., a time stamp T+2) into the field of "Time stamp" corresponding to the physical page 2 of the second physical block 202. Herein, the fourth stamp is greater than the third stamp.

In this way, regardless of whether there is a normal or abnormal power cycling, the processor 211 can update the flash translation layer tables corresponding to the third data and the fourth data in sequence according to the third stamp and the fourth stamp. Specifically, the processor 211 can update the flash translation layer table corresponding to the third physical block 203 storing the third data and the flash translation layer table corresponding to the second physical block 202 storing the fourth data in sequence according to the third stamp and the fourth stamp. Therefore, in the present embodiment, even if the logical address for storing the fourth data and the logical address for storing part of the third data are identical (e.g., to be LBA(5)*), the processor 211 can still update the flash translation layer tables according to a correct sequence, so as to prevent the asynchronous data write issue from happening.

It should be noted that, in the present embodiment, because there are no physical pages of the second physical block 202 and the third physical block 203 mapping to the identical logical address, the processor 211 can select any one of the second physical block 202 and the third physical block 203 having the time stamp T+1 for updating the flash translation layer table without affecting the data consistency even if power off occurs on the storage device 20 before the fourth data is written.

FIG. 3A to FIG. 3C are schematic diagrams illustrating the memory management method according to another embodiment of the invention.

With reference to FIG. 3A, FIG. 3A shows an operation of the processor 211 during an actual time Xt. Specifically, the processor 211 writes first data into a first physical block 301 and stores a first stamp corresponding to the first data (i.e., writing a time stamp T into the field of "Time stamp" corresponding to the first data). When all the pages (i.e., pages 0, 1 and 2) in the first physical block 301 are fully written by the first data, the processor 211 continues to write second data into a second physical block 302 and store a second stamp corresponding to the second data (i.e., writing a time stamp T+1 into the field of "Time stamp" corresponding to the second data). Because both the first data and the second data are host write data, information indicating "Host write" is written into the fields of "Type" corresponding to the first data and the second data, and such information may be a specific value represented by at least one bit.

With reference to FIG. 3B, FIG. 3B shows an operation of the processor 211 during an actual time Xt+1. Specifically, the processor 211 can perform the garbage collection operation on the first data in the first physical block 301. For instance, when the processor 211 determines that the first data of the physical pages 1 and 2 of the first physical block 301 (hereinafter, also known as the third data) are valid data and match a specific type (i.e., the logical pages corresponding to the third data in the first physical block 301 are not updated within a predetermined time), the processor 211 moves the third data to one garbage collection block, for example, the physical pages 0 and 1 of the third physical block 303. Meanwhile, the processor 211 writes a third stamp (i.e., a time stamp T+2) into the field of "Time stamp" corresponding to the physical pages 0 and 1 of the third physical block 303. Herein, the third stamp is greater than the second stamp. The processor 211 also writes information indicating "Garbage collection" into the field of "Type" corresponding to the physical pages 0 and 1 of the third physical block 203, and such information may be a specific value represented by at least one bit.

With reference to FIG. 3C, FIG. 3C shows an operation of the processor 211 during an actual time Xt+2. Specifically, when the processor 211 writes fourth data into the physical page 2 of the second physical block 302, the processor 211 writes a fourth stamp (i.e., a time stamp T+3) into the field of "Time stamp" corresponding to the physical page 2 of the second physical block 302. Herein, the fourth stamp is greater than the third stamp.

In this way, regardless of whether there is a normal or abnormal power cycling, the processor 211 can update the flash translation layer tables corresponding to the third data and the fourth data in sequence according to the third stamp and the fourth stamp. Specifically, the processor 211 can update the flash translation layer table corresponding to the third physical block 203 storing the third data and the flash translation layer table corresponding to the second physical block 202 storing the fourth data in sequence according to the third stamp and the fourth stamp. Therefore, in the present embodiment, even if the logical address for storing the fourth data and the logical address for storing part of the third data are identical (e.g., to be LBA(5)*), the processor 211 can still update the flash translation layer tables according to a correct sequence, so as to prevent the asynchronous data write issue from happening.

FIG. 4A to FIG. 4C are schematic diagrams illustrating the memory management method according to another embodiment of the invention.

With reference to FIG. 4A, FIG. 4A shows an operation of the processor 211 during an actual time Xt. Specifically, the processor 211 writes first data into the first physical block 401 and stores a first stamp T corresponding to the first physical block 401 (i.e., storing identification information of the first stamp T and the corresponding first physical block 401 to a system block 410). When all the pages (i.e., the pages 0, 1 and 2) of the first physical block 401 are fully written by the first data, the processor 211 continues to write second data into a second physical block 402 and store a second stamp T+1 corresponding to the second physical block 402 (i.e., storing identification information of the second stamp T+1 and the corresponding second physical block 402 to the system block 410).

With reference to FIG. 4B, FIG. 4B shows an operation of the processor 211 during an actual time Xt+1. Specifically, the processor 211 can perform the garbage collection operation on the first data in the first physical block 401. For instance, when the processor 211 determines that the first data of the physical pages 1 and 2 of the first physical block 401 (hereinafter, also known as the third data) are valid data and match a specific type (i.e., the logical pages corresponding to the third data in the first physical block 401 are not updated within a predetermined time), the processor 211 moves the third data to one garbage collection block, for example, the physical pages 0 and 1 of the third physical block 403. Meanwhile, the processor 211 stores a third stamp T+1 corresponding to a third physical block 403 and updates the second stamp T+1 corresponding to the second physical block 402 to a fourth stamp T+2 in the system block 410. Herein, the fourth stamp T+2 is greater than the third stamp T+1 and the third stamp T+1 is equal to the second stamp T+1.

With reference to FIG. 4C, FIG. 4C shows an operation of the processor 211 during an actual time Xt+2. Specifically, when the processor 211 writes fourth data into the physical page 2 of the second physical block 402, the fourth stamp T+2 corresponding to the second physical block 402 remains unchanged in the system block 410.

In this way, regardless of whether there is a normal or abnormal power cycling, the processor 211 can update the flash translation layer tables corresponding to the third data and the fourth data in sequence according to the third stamp and the fourth stamp. Specifically, the processor 211 can update the flash translation layer table corresponding to the third physical block 403 storing the third data and the flash translation layer table corresponding to the second physical block 402 storing the fourth data in sequence according to the third stamp and the fourth stamp. Therefore, in the present embodiment, even if the logical address for storing the fourth data and the logical address for storing part of the third data are identical (e.g., to be LBA(5)*), the processor 211 can still update the flash translation layer tables according to a correct sequence, so as to prevent the asynchronous data write issue from happening.

FIG. 5A to FIG. 5C are schematic diagrams illustrating the memory management method according to another embodiment of the invention.

With reference to FIG. 5A, FIG. 5A shows an operation of the processor 211 during an actual time Xt. Specifically, the processor 211 writes first data into the first physical block 501 and stores a first stamp T corresponding to the first physical block 501 (i.e., storing identification information of the first stamp T and the corresponding first physical block 501 to a system block 510). When all the pages (i.e., the pages 0, 1 and 2) of the first physical block 501 are fully written by the first data, the processor 211 continues to write second data into a second physical block 502 and store a second stamp T+1 corresponding to the second physical block 502 (i.e., storing identification information of the second stamp T+1 and the corresponding second physical block 502 to the system block 510).

With reference to FIG. 5B, FIG. 5B shows an operation of the processor 211 during an actual time Xt+1. Specifically, the processor 211 can perform the garbage collection operation on the first data in the first physical block 501. For instance, when the processor 211 determines that the first data of the physical pages 1 and 2 of the first physical block 501 (hereinafter, also known as the third data) are valid data and match a specific type (i.e., the logical pages corresponding to the third data in the first physical block 501 are not updated within a predetermined time), the processor 211 moves the third data to one garbage collection block, for example, the physical pages 0 and 1 of the third physical block 503. Meanwhile, the processor 211 stores a third stamp T+2 corresponding to a third physical block 503 and updates the second stamp T+1 corresponding to the second physical block 502 to a fourth stamp T+3 in the system block 510. Herein, the fourth stamp T+3 is greater than the third stamp T+2 and the third stamp T+2 is greater than the second stamp T+1.

With reference to FIG. 5C, FIG. 5C shows an operation of the processor 211 during an actual time Xt+2. Specifically, when the processor 211 writes fourth data into the physical page 2 of the second physical block 502, the fourth stamp T+3 corresponding to the second physical block 502 remains unchanged in the system block 510.

In this way, regardless of whether there is a normal or abnormal power cycling, the processor 211 can update the flash translation layer tables corresponding to the third data and the fourth data in sequence according to the third stamp and the fourth stamp. Specifically, the processor 211 can update the flash translation layer table corresponding to the third physical block 503 storing the third data and the flash translation layer table corresponding to the second physical block 502 storing the fourth data in sequence according to the third stamp and the fourth stamp. Therefore, in the present embodiment, even if the logical address for storing the fourth data and the logical address for storing part of the third data are identical (e.g., to be LBA(5)*), the processor 211 can still update the flash translation layer tables according to a correct sequence, so as to prevent the asynchronous data write issue from happening.

Figure 6:
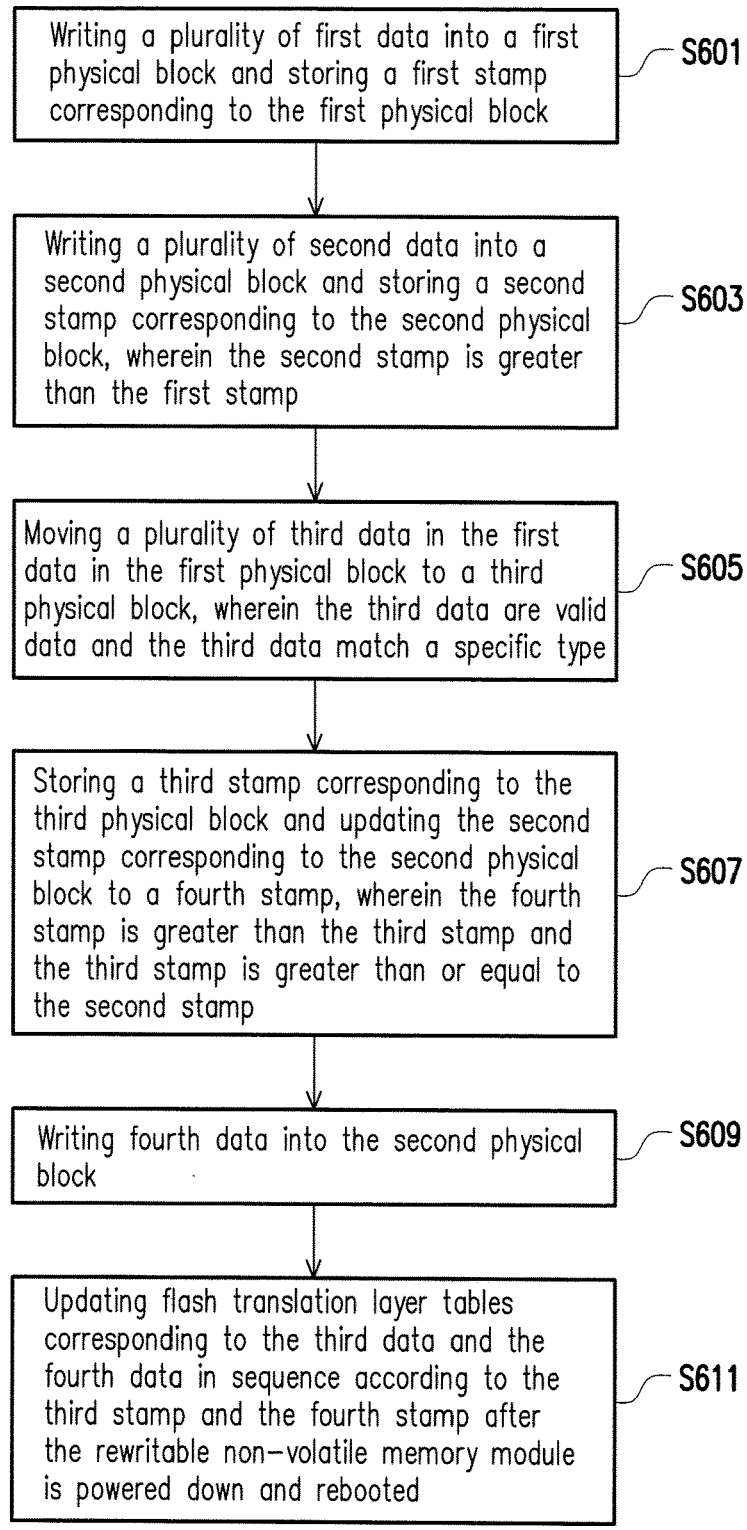
FIG. 6 is a flowchart illustrating the memory management method according to an embodiment of the invention.

FIG. 6 is a flowchart illustrating the memory management method according to an embodiment of the invention.

In step S601, a plurality of first data are written into a first physical block and a first stamp corresponding to the first physical block is stored.

In step S603, a plurality of second data are written into a second physical block and a second stamp corresponding to the second physical block is stored, where the second stamp is greater than the first stamp.

In step S605, a plurality of third data in the first data in the first physical block are moved to a third physical block, where the third data are valid data and the third data match a specific type. The third data is determined as matching the specific type when logical pages corresponding to the third data in the first physical block are not updated within a predetermined time.

In step S607, a third stamp corresponding to the third physical block is stored and the second stamp corresponding to the second physical block is updated to a fourth stamp, where the fourth stamp is greater than the third stamp and the third stamp is greater than or equal to the second stamp.

In step S609, fourth data is written into the second physical block.

In step S611, flash translation layer tables corresponding to the third data and the fourth data are updated in sequence according to the third stamp and the fourth stamp after the rewritable non-volatile memory module is powered down and rebooted.

Figure 7:
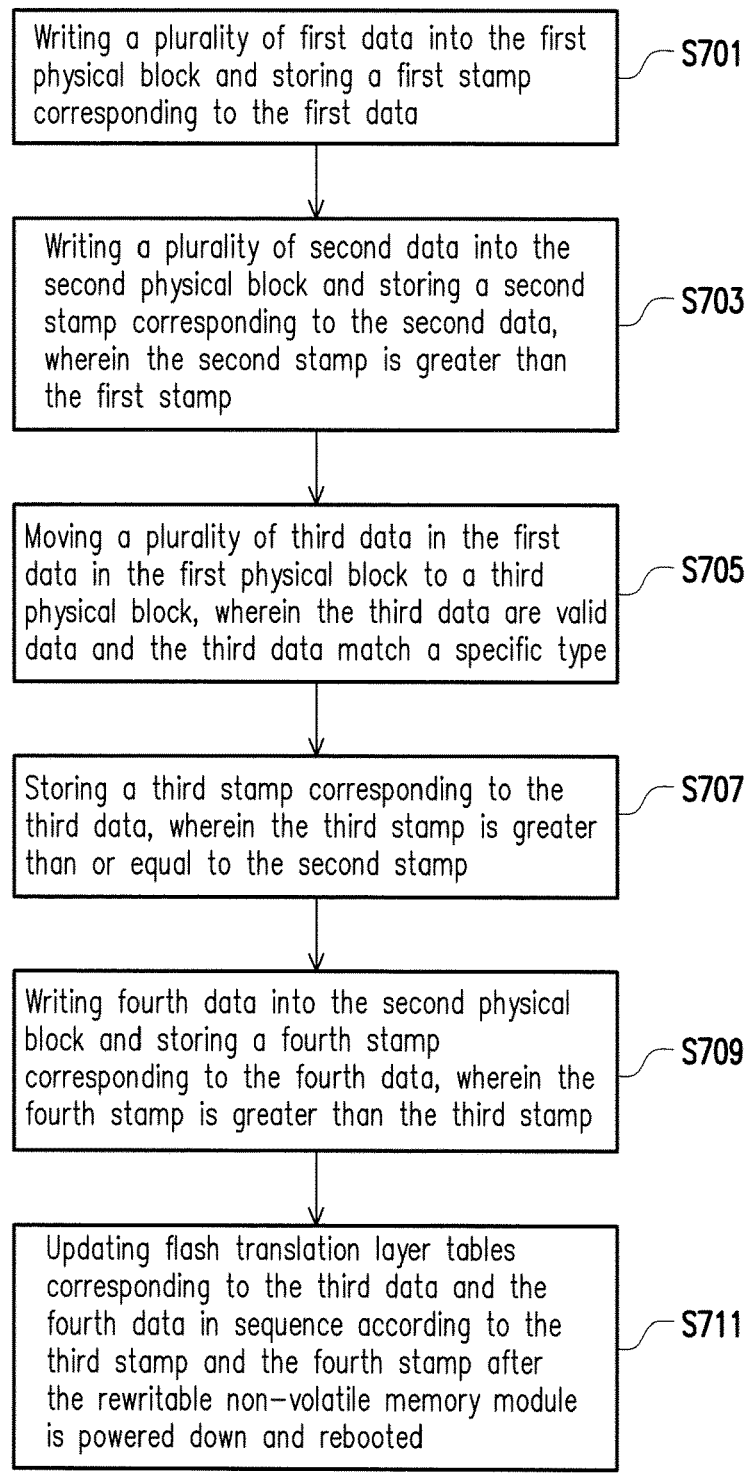
FIG. 7 is a flowchart illustrating the memory management method according to another embodiment of the invention.

FIG. 7 is a flowchart illustrating the memory management method according to another embodiment of the invention.

In step S701, a plurality of first data are written into the first physical block and a first stamp corresponding to the first data is stored.

In step S703, a plurality of second data are written into the second physical block and a second stamp corresponding to the second data is stored, where the second stamp is greater than the first stamp.

In step S705, a plurality of third data in the first data in the first physical block are moved to the third physical block, where the third data are valid data and the third data match a specific type. The third data is determined as matching the specific type when logical pages corresponding to the third data in the first physical block are not updated within a predetermined time.

In step S707, a third stamp corresponding to the third data is stored, where the third stamp is greater than or equal to the second stamp.

In step S709, fourth data is written into the second physical block and a fourth stamp corresponding to the fourth data is stored, where the fourth stamp is greater than the third stamp.

In step S711, flash translation layer tables corresponding to the third data and the fourth data are updated in sequence according to the third stamp and the fourth stamp after the rewritable non-volatile memory module is powered down and rebooted.

In summary, according to the memory management method and the storage controller using the method proposed in the invention, the time stamp of the host write block is updated when the physical block for the garbage collection is allocated by the system so the stamp of the host write block becomes greater than the stamp of the garbage collection block. In this way, even if part of logical addresses of data in the host write block are identical to part of logical addresses of data in the garbage collection block, regardless of whether a storage device is normally or abnormally powered down and rebooted, the flash translation layer table of the garbage collection block is updated before updating the flash translation layer table of the host write block. As a result, the asynchronous data write issue can be solved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method, adapted to a rewritable non-volatile memory module, wherein the rewritable non-volatile memory module comprises a plurality of physical blocks, each of the physical blocks comprises a plurality of physical programming units, the physical blocks comprise a first physical block, a second physical block and a third physical block, and the memory management method comprises:
    writing a plurality of first data into the first physical block and storing a first stamp corresponding to the first physical block, wherein storing the first stamp is performed before writing the plurality of first data into the first physical block;
    writing a plurality of second data into the second physical block and storing a second stamp corresponding to the second physical block, wherein storing the second stamp is performed before writing the plurality of second data to the second physical block, and the second stamp is greater than the first stamp;
    moving a plurality of third data in the first data in the first physical block to the third physical block, wherein the third data are valid data and the third data match a specific type; and
    storing a third stamp corresponding to the third physical block and updating the second stamp corresponding to the second physical block to a fourth stamp, wherein updating the second stamp to the fourth stamp is performed before moving the plurality of third data in the first data to the third physical block, wherein the fourth stamp is greater than the third stamp and the third stamp is greater than or equal to the second stamp.

2. The memory management method according to claim 1, further comprising:
    writing a fourth data into the second physical block; and
    updating flash translation layer tables corresponding to the third data and the fourth data in sequence according to the third stamp and the fourth stamp after the rewritable non-volatile memory module is powered down and rebooted.

3. The memory management method according to claim 2, wherein the step of updating the flash translation layer tables corresponding to the third data and the fourth data in sequence according to the third stamp and the fourth stamp comprises:
    updating the flash translation layer table corresponding to the third physical block storing the third data and the flash translation layer table corresponding to the second physical block storing the fourth data in sequence according to the third stamp and the fourth stamp.

4. The memory management method according to claim 1, wherein the third data is determined as matching the specific type when logical pages corresponding to the third data in the first physical block are not updated within a predetermined time.

5. The memory management method according to claim 1, wherein the first stamp, the second stamp, the third stamp and the fourth stamp are stored in a system block of the physical blocks.

6. A storage controller, configured to access a rewritable non-volatile memory module and coupled to a host system through a connection interface circuit, the storage controller comprising:
    a memory interface control circuit, configured to couple to the rewritable non-volatile memory module, wherein the rewritable non-volatile memory module comprises a plurality of physical blocks, each of the physical blocks comprises a plurality of physical programming units, the physical blocks comprise a first physical block, a second physical block and a third physical block;
    a processor, coupled to the connection interface circuit and the memory interface control circuit; and
    a data transfer management circuit, coupled to the processor, the connection interface circuit and the memory interface control circuit,
    wherein the processor writes a plurality of first data into the first physical block and stores a first stamp corresponding to the first physical block, wherein the processor stores the first stamp before writing the plurality of first data into the first physical block,
    wherein the processor writes a plurality of second data into the second physical block and stores a second stamp corresponding to the second physical block, wherein the processor stores the second stamp before writing the plurality of second data into the second physical block, wherein the second stamp is greater than the first stamp,
    wherein the processor moves a plurality of third data in the first data in the first physical block to the third physical block, wherein the third data are valid data and the third data match a specific type,
    wherein the processor stores a third stamp corresponding to the third physical block and updates the second stamp corresponding to the second physical block to a fourth stamp, wherein the processor updates the second stamp to the fourth stamp before moving the plurality of third data in the first data to the third physical block, wherein the fourth stamp is greater than the third stamp and the third stamp is greater than or equal to the second stamp.

7. The storage controller according to claim 6, wherein the processor writes a fourth data into the second physical block,
    wherein the processor updates flash translation layer tables corresponding to the third data and the fourth data in sequence according to the third stamp and the fourth stamp after the rewritable non-volatile memory module is powered down and rebooted.

8. The storage controller according to claim 7, wherein the processor updates the flash translation layer table corresponding to the third physical block storing the third data and the flash translation layer table corresponding to the second physical block storing the fourth data in sequence according to the third stamp and the fourth stamp.

9. The storage controller according to claim 6, wherein the processor determines the third data as matching the specific type when logical pages corresponding to the third data in the first physical block are not updated within a predetermined time.

10. The storage controller according to claim 6, wherein the first stamp, the second stamp, the third stamp and the fourth stamp are stored in a system block of the physical blocks.

11. A memory management method, adapted to a rewritable non-volatile memory module, wherein the rewritable non-volatile memory module comprises a plurality of physical blocks, each of the physical blocks comprises a plurality of physical programming units, the physical blocks comprise a first physical block, a second physical block and a third physical block, and the memory management method comprises:
    writing a plurality of first data into the first physical block and storing a first stamp corresponding to the first data, wherein storing the first stamp is performed before writing the plurality of first data into the first physical block;
    writing a plurality of second data into the second physical block and storing a second stamp corresponding to the second data, wherein storing the second stamp is performed before writing the plurality of second data to the second physical block, and the second stamp is greater than the first stamp;
    moving a plurality of third data in the first data in the first physical block to the third physical block, wherein the third data are valid data and the third data match a specific type;
    storing a third stamp corresponding to the third data, wherein updating the second stamp to the fourth stamp is performed before moving the plurality of third data in the first data to the third physical block, wherein the third stamp is greater than or equal to the second stamp; and
    writing a fourth data into the second physical block and storing a fourth stamp corresponding to the fourth data, wherein the fourth stamp is greater than the third stamp.

12. The memory management method according to claim 11, further comprising:
    updating flash translation layer tables corresponding to the third data and the fourth data in sequence according to the third stamp and the fourth stamp after the rewritable non-volatile memory module is powered down and rebooted.

13. The memory management method according to claim 12, wherein the step of updating the flash translation layer tables corresponding to the third data and the fourth data in sequence according to the third stamp and the fourth stamp comprises:
    updating the flash translation layer table corresponding to the third physical block storing the third data and the flash translation layer table corresponding to the second physical block storing the fourth data in sequence according to the third stamp and the fourth stamp.

14. The memory management method according to claim 11, wherein the third data is determined as matching the specific type when logical pages corresponding to the third data in the first physical block are not updated within a predetermined time.

15. The memory management method according to claim 11, wherein the first stamp, the second stamp, the third stamp and the fourth stamp are stored in an out of band area corresponding to each of the physical programming units of the physical blocks.

16. A storage controller, configured to access a rewritable non-volatile memory module and coupled to a host system through a connection interface circuit, the storage controller comprising:
    a memory interface control circuit, configured to couple to the rewritable non-volatile memory module, wherein the rewritable non-volatile memory module comprises a plurality of physical blocks, each of the physical blocks comprises a plurality of physical programming units, the physical blocks comprise a first physical block, a second physical block and a third physical block;
    a processor, coupled to the connection interface circuit and the memory interface control circuit; and
    a data transfer management circuit, coupled to the processor, the connection interface circuit and the memory interface control circuit,
    wherein the processor writes a plurality of first data into the first physical block and stores a first stamp corresponding to the first data, wherein the processor stores the first stamp before writing the plurality of first data into the first physical block,
    wherein the processor writes a plurality of second data into the second physical block and stores a second stamp corresponding to the second data, wherein the processor stores the second stamp before writing the plurality of second data into the second physical block, wherein the second stamp is greater than the first stamp,
    wherein the processor moves a plurality of third data in the first data in the first physical block to the third physical block, wherein the third data are valid data and the third data match a specific type,
    wherein the processor stores a third stamp corresponding to the third data, wherein the processor updates the second stamp to the fourth stamp before moving the plurality of third data in the first data to the third physical block, wherein the third stamp is greater than or equal to the second stamp,
    wherein the processor writes a fourth data into the second physical block and stores a fourth stamp corresponding to the fourth data, wherein the fourth stamp is greater than the third stamp.

17. The storage controller according to claim 16, wherein the processor updates flash translation layer tables corresponding to the third data and the fourth data in sequence according to the third stamp and the fourth stamp after the rewritable non-volatile memory module is powered down and rebooted.

18. The storage controller according to claim 17, wherein the processor updates the flash translation layer table corresponding to the third physical block storing the third data and the flash translation layer table corresponding to the second physical block storing the fourth data in sequence according to the third stamp and the fourth stamp.

19. The storage controller according to claim 16, wherein the processor determines the third data as matching the specific type when logical pages corresponding to the third data in the first physical block are not updated within a predetermined time.

20. The storage controller according to claim 16, wherein the first stamp, the second stamp, the third stamp and the fourth stamp are stored in an out of band area corresponding to each of the physical programming units of the physical blocks.

* * * * *